Oct. 3, 1967 W. J. GILMORE 3,345,456
ELECTRICALLY CONDUCTIVE TENSILE CABLE
Filed Dec. 6, 1965
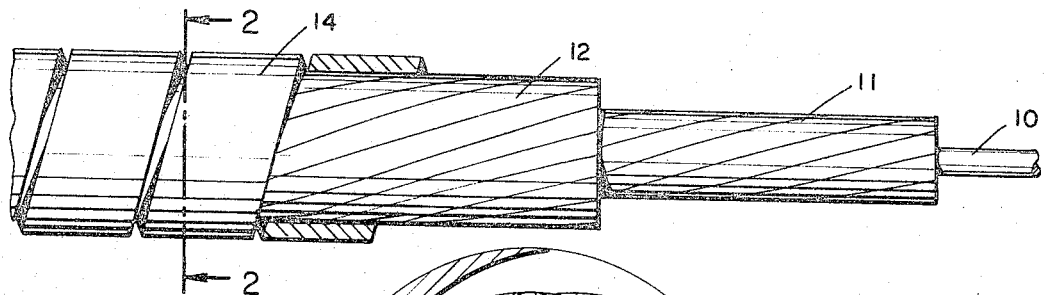
FIG. 1
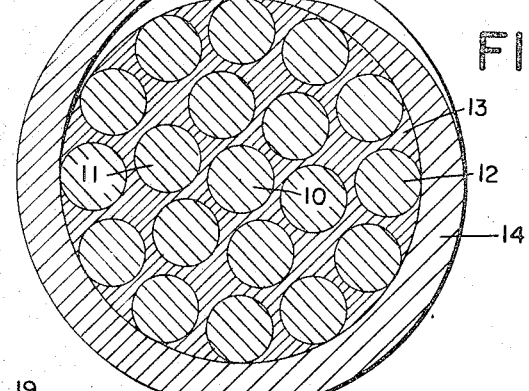
FIG. 2
FIG. 3
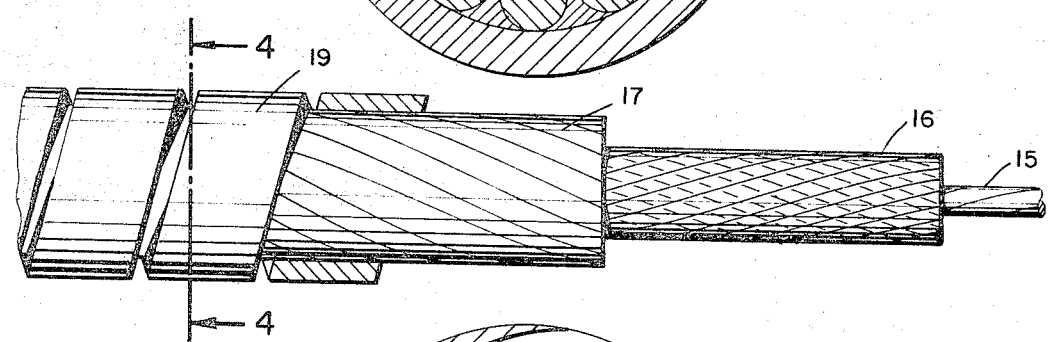
FIG. 4
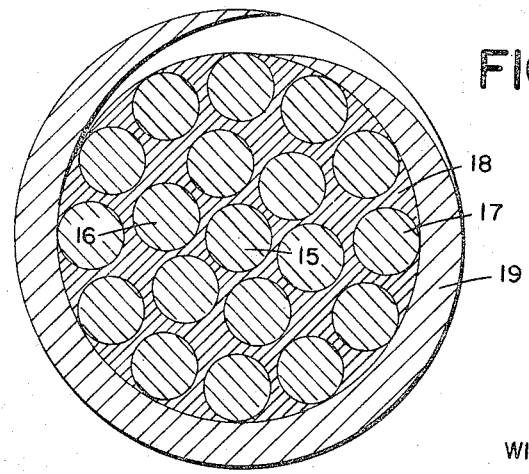
INVENTOR.
WILLIAM J. GILMORE
BY
ATTORNEYS

United States Patent Office 3,345,456
Patented Oct. 3, 1967

3,345,456
ELECTRICALLY CONDUCTIVE TENSILE CABLE
William J. Gilmore, Manitou Beach, Mich., assignor to American Chain & Cable Company, Inc., New York, N.Y., a corporation of New York
Filed Dec. 6, 1965, Ser. No. 511,813
6 Claims. (Cl. 174—128)

This invention relates to cable having high tensile strength and electrical conductivity and to its method of manufacture. More particularly, the invention concerns cable wherein a matrix of electrically conductive metal fills the interstices between helically stranded load-bearing wires.

While the present invention serves many purposes, it is especially suitable for use as a combined aircraft antenna and target tow line. Since a drogue, or target, is pulled along behind its towing aircraft by a length of stranded steel cable which may be several thousand yards long, the tow cable has the potential of serving as a highly effective antenna for reception and transmission of radio signals. However, the electrical conductivity of conventional tensile load-bearing stranded steel cable is insufficient for use as a high frequency antenna and it must be increased by the addition of conductive elements to the cable structure. But at the same time no very appreciable increase should be made in the cross sectional area of the cable because that compounds the effect of air drag and imposes additional tensile stress. A composite cable of large diameter encounters extreme wind resistance at high velocities which adds enormously to the stress put upon it during use, and this load coupled with its own weight and the weight and drag of the drogue can become prohibitively great for known cable designs. It is a major purpose of this invention to provide an electrically conductive cable structure which is adequately light in weight and thin in longitudinal cross section to serve as a satisfactory load-bearing and current-carrying tow cable and antenna combination.

Broadly stated, the cable of the invention comprises a plurality of layers of helically stranded load-bearing wires and a metal matrix substantially filling all interstices between the load-bearing wires. The metal matrix is substantially more electrically conductive than the load-bearing wires. The cable's method of fabrication comprises helically stranding together a plurality of layers of the load-bearing wires, at least the majority of which are clad throughout their length with the metal which is substantially more electrically conductive than the load-bearing wires. Then the stranded clad load-bearing wires are radially compressed together so that the metal substantially fills all the interstices between the load-bearing wires.

In the finished cable the lateral cross section is substantially, if not entirely, solid metal. The hard load-bearing wires retain their original cross section and all voids and interstices between them are filled with the softer and far more electrically conductive matrix metal. In many instances, steel serves best for the load-bearing wires and copper for the matrix around them. By initially cladding the load-bearing wires with the matrix metal, optimum control can be asserted over its mass relative to the load-bearing wires and uniformity in the solid cross section can be maintained throughout the length of the cable. The matrix metal and load-bearing wires complement each other in function, since the former provides an electrically conductive path for current transmission without increasing cross sectional area (and thus wind drag in an aircraft tow line) while the latter contribute high tensile strength. Also, the matrix of soft metal prevents the load-bearing wires from notching one another when they are subjected to the radial compression step during fabrication, which is otherwise a danger in cross lay stranded cables particularly.

Preferred embodiments of the invention are described hereinbelow with reference to the accompanying drawing, wherein FIG. 1 is a fragmentary elevation partly broken away of a form of the new cable having layers of stranded wires laid in the same direction;

FIG. 2 is an enlarged section taken along the line 2—2 of FIG. 1;

FIG. 3 is a fragmentary elevation partly broken away of a form of the new cable having alternate layers of stranded wires laid in opposite direction; and FIG. 4 is an enlarged section taken along the line 4—4 of FIG. 3.

In the embodiment of FIGS. 1 and 2, a 1 x 19 stranded construction of the new cable is illustrated in which a central core wire 10 is surrounded by a first layer of six helically disposed wires 11, and they in turn are surrounded by a second layer of twelve additional helically disposed wires 12. Both layers are stranded in a lay of the same direction. Each of these load-bearing wires is .030 inch in diameter and is coated or clad with copper over a high tensile strength steel center. For example, a steel wire of 0.82% to 0.90% by weight carbon and 0.25% to 0.60% by weight manganese having a minimum tensile strength of 260,000 p.s.i. may be coated by any conventional method, such as by electrodeposition, with commercially pure copper which constitutes 26% by weight of the entire wire.

After the layers 11 and 12 are stranded, the cable is subjected to radial reduction of diameter which compresses the wires together and forces the copper coating on each of them into the various interstices between the wires so that a matrix 13 forms a solid cross section around the wires as shown in FIG. 2. The thickness of the original copper coating may be correlated with respect to the diameter of the steel wires to insure that all the inter-wire voids are filled with the copper during the swaging step. Since the copper coating is much softer than the steel of each load-bearing wire, the copper flows easily into the interstices of the stranded construction and the steel wires themselves undergo no change in cross section. The percentage by weight of the copper matrix in the cross section of the swaged stranded construction remains substantially 26% by weight of the whole, and without increasing the diameter of the stranded construction its electrical conductivity is increased substantially.

For additional current-carrying capacity, one or more layers of flat wire 14 may be wrapped helically about the outer layer of the stranded construction as shown in FIG. 1 with the turns of the flat wire 13 spaced apart and having a lay substantially shorter than that of the wires 12 of the outer layer. The flat wire 13 is preferably of the same metal as the matrix 13 in the interstices between the load-bearing wires, which in this instance is copper. If another layer of flat wire is to be wrapped about that shown in FIG. 1, its center line should overlay the inter-turn spaces of the flat wire 13 to provide the optimum current-carrying path. After the one or more flat wires 14 are wrapped in place, the assembly is again swaged radially so that the flat wire tightly grips the solid load-bearing wires and matrix.

The embodiment shown in FIGS. 3 and 4 is similar to that shown in FIGS. 1 and 2 in all respects except that it is of cross lay construction. A core wire 15 has six wires 16 helically disposed about it in a left lay, and they in turn have a layer of twelve wires 17 helically disposed about them in a right lay. Each of these load-bearing wires is clad as described previously and swaged after stranding so that the clad metal is forced into all interstices between them in a solid matrix 18 as shown in FIG. 4. An outer wrap of at least one flat wire 19 may again be provided, and it is subjected to an individual swaging step to bind it securely about the stranded construction. In this cross lay form of FIGS. 3 and 4, the matrix 18 of soft electrically conductive metal not only increases the current-carrying capacity of the cable but also serves as a cushion during the swaging steps to prevent the crossed load-bearing wires in the respective layers 16 and 17 from nicking one another.

In either of these embodiments the 1 x 19 stranded construction described is not essential to the invention and 7 x 7, 7 x 19 or other well known constructions may be used instead. Whichever is used, it is also contemplated that where lesser tensile strength can be tolerated the conductivity of the entire cable may be increased by substituting for the central core wire, or perhaps certain wires in the stranded layers applied thereabout, a wire which is formed entirely of the electrically conductive metal of the matrix, such as copper. Conversely, if greater tensile strength is required for a specific application the central core wire or other wires in the stranded layers applied thereabout may be uncoated high tensile wire which will result in a construction having greater tensile strength at some sacrifice to the conductive properties. Metals other than copper may be employed for this purpose, and for the matrix and the outer flat wire or wires, such as sliver, aluminum or cadmium. Each of the load-bearing wires may also be of various alloys of high tensile strength in addition to the one alloy mentioned previously, such as hard drawn stainless steel. Also, if a core wire of high electrical conductivity is used, it may be of substantially larger diameter than the wires stranded about it.

Aside from the outer wrap of flat wire, it is preferred that all wires in either embodiment be of round cross section before swaging and that all coatings of electrically conductive metal be cylindrical in shape. After swaging, the high tensile strength wires (referred to in the following claims as the load-bearing wires) will retain their round cross section and the coatings about them, and any interposed electrically conductive wires stranded with them, will be deformed into an exteriorly cylindrical matrix in which the load-bearing wires are embedded as shown in the drawing.

I claim:
1. A cable of high tensile strength and electrical conductivity comprising a plurality of layers of helically stranded steel load-bearing wires, and a copper matrix substantially filling all interstices between said load-bearing wires, said copper matrix being substantially more electrically conductive than said load-bearing wires.

2. A cable according to claim 1 wherein the lay of said load-bearing wires is in the same direction in each layer thereof.

3. A cable according to claim 1 wherein the lay of said load-bearing wires is in opposite directions in alternate layers thereof.

4. A cable of high tensile strength and electrical conductivity comprising a plurality of layers of helically stranded load-bearing wires, a metal matrix substantially filling all interstices between said load-bearing wires, said metal matrix being substantially more electrically conductive than said load-bearing wires, and a central core wire of the same metal as said metal matrix and about which said load-bearing wires are disposed.

5. A cable of high tensile strength and electrical conductivity comprising a plurality of layers of helically stranded load-bearing wires, a metal matrix substantially filling all interstices between said load-bearing wires, said metal matrix being substantially more electrically conductive than said load-bearing wires, and wires of the same metal as said metal matrix helically stranded together with said load-bearing wires.

6. A cable of high tensile strength and electrical conductivity comprising a plurality of layers of helically stranded steel load-bearing wires, a copper matrix substantially filling all interstices between said load-bearing wires, said copper matrix being substantially more electrically conductive than said load-bearing wires, and at least one copper flat wire helically disposed tightly about said load-bearing wires and matrix with the turns of said flat wire spaced apart and having a lay shorter than that of the load-bearing wires.

References Cited
UNITED STATES PATENTS

| | | | |
|---|---|---|---|
| 1,691,869 | 11/1928 | Fowle | 174—126 X |
| 1,760,409 | 5/1930 | Howe | 174—128 |
| 2,132,235 | 10/1938 | Green | 174—128 X |
| 3,131,469 | 5/1964 | Glaze. | |
| 3,234,722 | 2/1966 | Gilmore. | |

LEWIS H. MYERS, *Primary Examiner.*

E. GOLDBERG, *Assistant Examiner.*